(12) United States Patent
Ladeira

(10) Patent No.: US 6,318,402 B1
(45) Date of Patent: Nov. 20, 2001

(54) PNEUMATIC TANK TRUCK CLOSURE APPARATUS

(76) Inventor: Richard Ladeira, 30 Madeira Ct., Oakley, CA (US) 94561

( * ) Notice: Subject to any disclaimer, the term of this patent is extended or adjusted under 35 U.S.C. 154(b) by 0 days.

(21) Appl. No.: 09/578,546

(22) Filed: May 25, 2000

(51) Int. Cl.$^7$ .......................... F16K 31/122; F16K 25/00; B08B 9/032
(52) U.S. Cl. ................ 137/240; 141/98; 251/62; 251/158; 251/175; 251/193; 251/326; 251/328
(58) Field of Search ................ 137/240; 251/62, 251/144, 159, 167, 172, 175, 193, 195, 327, 328, 58, 158, 326; 141/98, 287, 307

(56) References Cited

U.S. PATENT DOCUMENTS

| | | | |
|---|---|---|---|
| 2,313,095 | * 3/1943 | Schneider | ................. 251/58 |
| 3,339,785 | 9/1967 | Nugent . | |
| 3,352,446 | 11/1967 | Anderson et al. . | |
| 3,623,627 | 11/1971 | Bolton . | |
| 3,694,962 | 10/1972 | McDonald et al. . | |
| 3,747,275 | 7/1973 | May et al. . | |
| 3,946,772 | 3/1976 | Mize . | |
| 4,150,509 | 4/1979 | Knap . | |
| 4,174,728 | * 11/1979 | Usnick et al. | ................. 137/240 |
| 4,228,135 | 10/1980 | Wolff . | |
| 4,235,256 | * 11/1980 | Crawshay | ................. 251/62 |
| 4,292,992 | * 10/1981 | Bhidé | ................. 137/240 |
| 4,383,546 | * 5/1983 | Walters, Jr. | ................. 137/240 |
| 4,512,363 | * 4/1985 | Jandrasi et al. | ................. 251/328 |
| 4,561,472 | * 12/1985 | Dreyer et al. | ................. 137/240 |
| 4,709,901 | * 12/1987 | Pierson et al. | ................. 251/58 |
| 4,785,844 | * 11/1988 | Pankov | ................. 137/240 |
| 4,838,301 | * 6/1989 | Lamort | ................. 137/240 |
| 4,938,250 | * 7/1990 | Peterson | ................. 137/240 |
| 5,176,189 | * 1/1993 | Perchathaler et al. | ................. 137/240 |
| 5,295,605 | 3/1994 | Kawahito et al. . | |

* cited by examiner

Primary Examiner—George L. Walton
(74) Attorney, Agent, or Firm—Thomas R. Lampe

(57) ABSTRACT

A closure is movably mounted on the tank top of a pneumatic tank truck. The closure is movable between open and closed positions relative to an opening in the tank top by a pneumatically operated piston. An inflatable seal seals the closure to the tank top when the closure is in open position. Air jets are employed to clean dirt and debris from a guide supporting the closure. All operations can be performed without the driver climbing to the tank top.

16 Claims, 8 Drawing Sheets

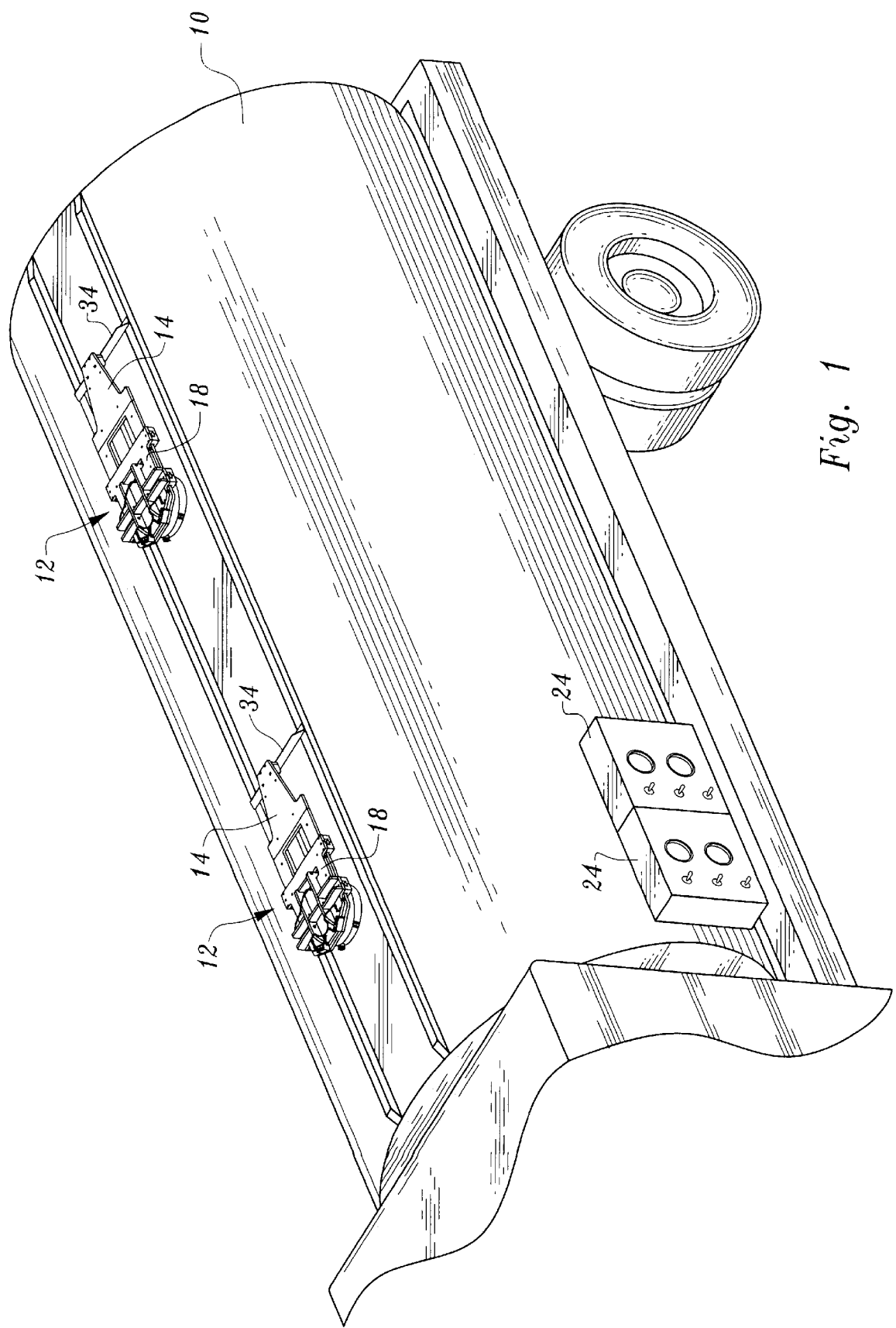

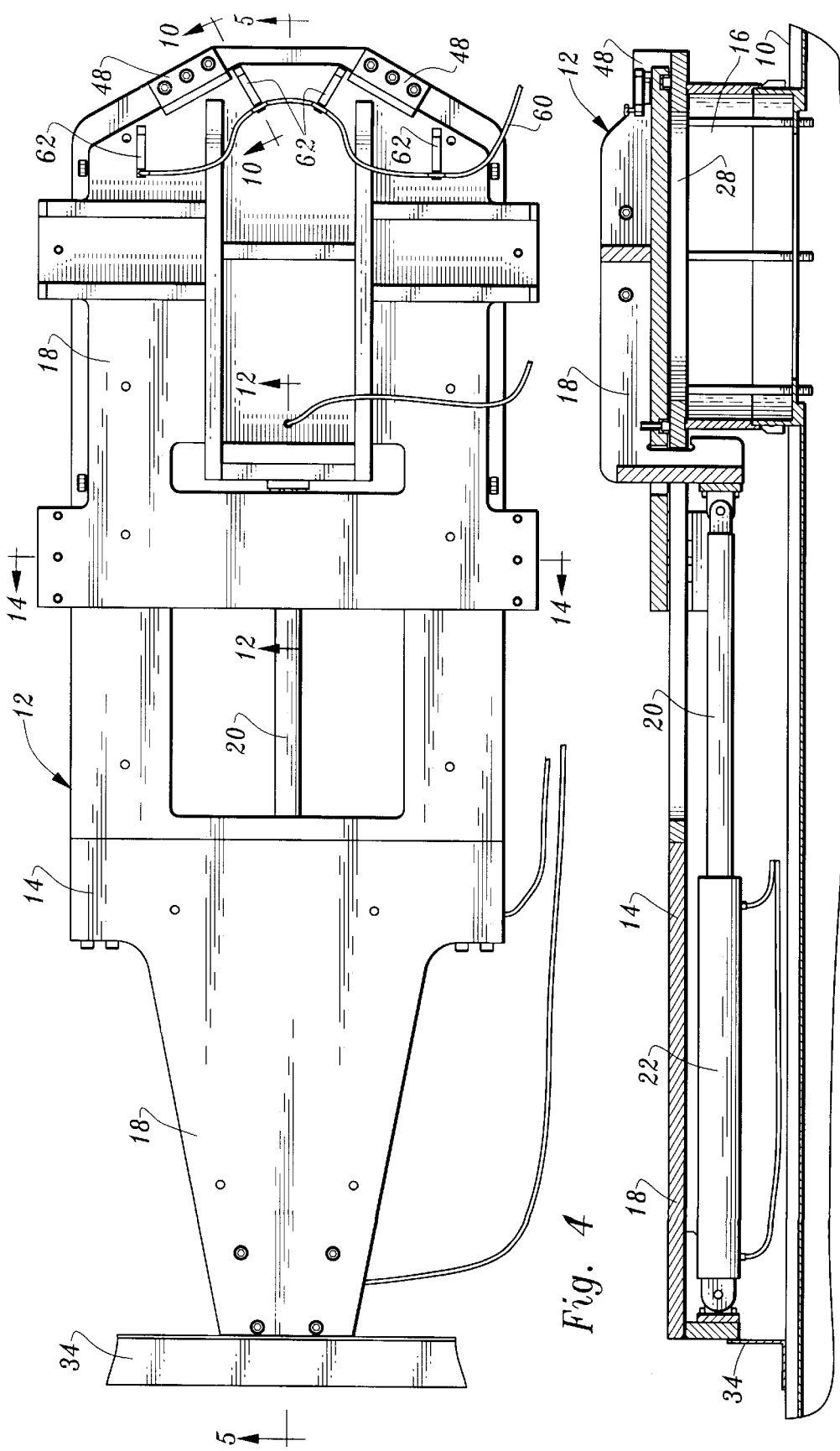

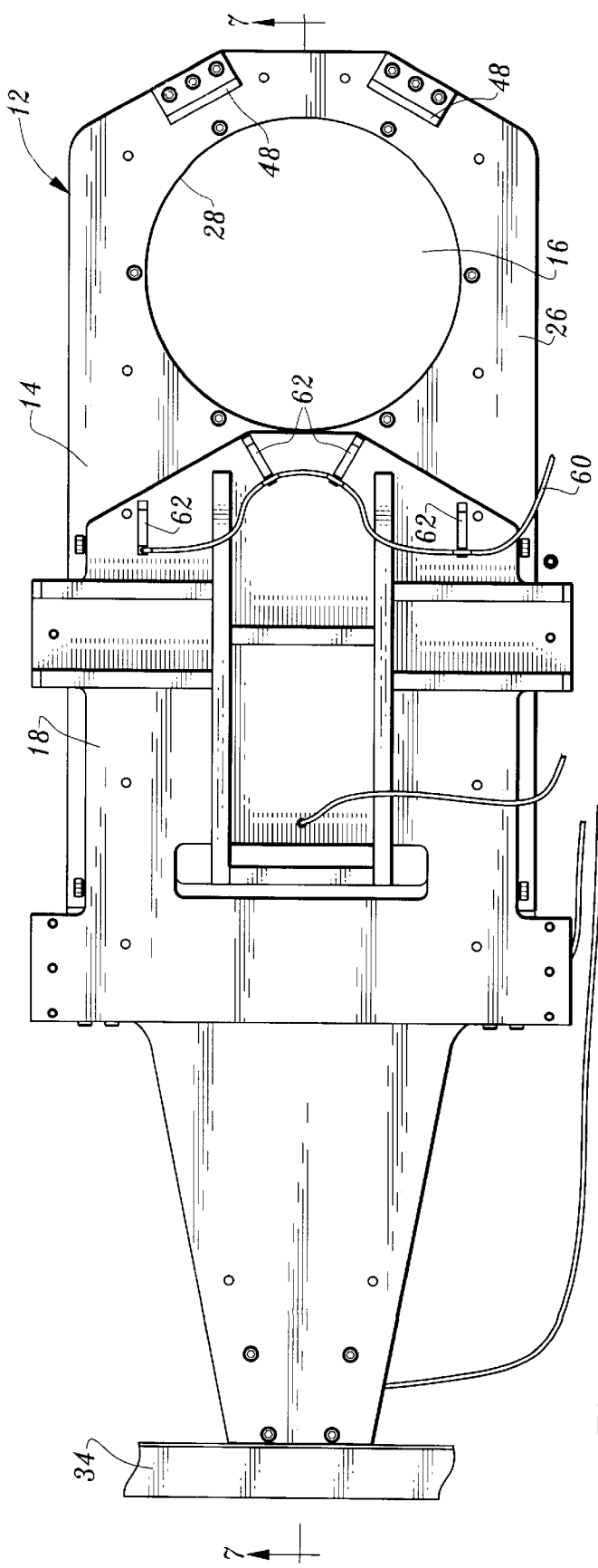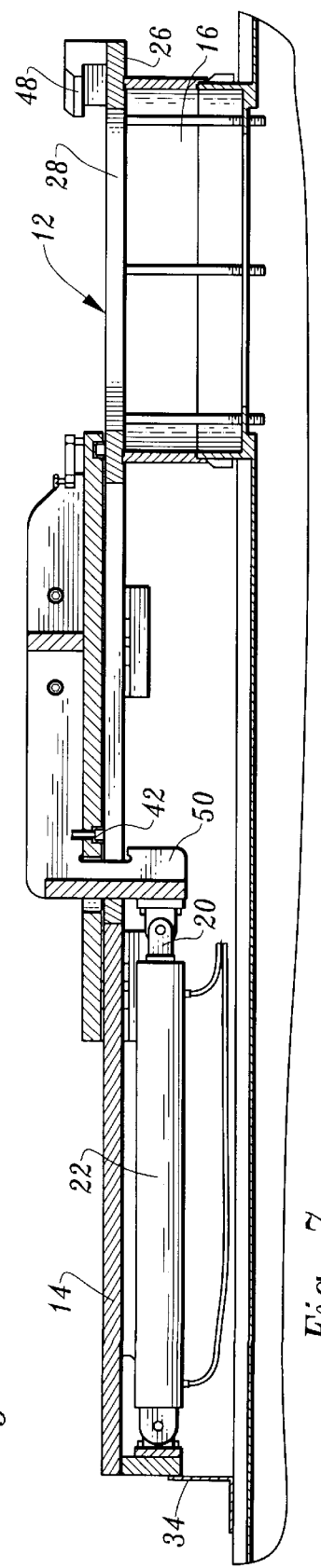
Fig. 6
Fig. 7

PNEUMATIC TANK TRUCK CLOSURE APPARATUS

TECHNICAL FIELD

This invention relates to pneumatic tank trucks and more particularly, to a closure employed on such trucks.

BACKGROUND OF THE INVENTION

Pneumatic tank trucks are in widespread usage for transport of fluent materials, such materials being maintained under pressurized conditions. Pneumatic tank trucks employ one or more openings or hatchways located at the tank top. These openings are covered by a closure or hatch cover which forms a seal with the tank. Conventionally such covers must be opened and closed manually, the truck driver or other individual being required to climb to the top of the truck to perform the required task each and every time the closure must be opened or closed. This is not only time consuming but also dangerous, particularly when the tank top is dirty or slippery. The operation is particularly difficult and dangerous in inclement weather conditions.

As will be seen in greater detail below, the present invention encompasses a closure device which either opens or closes without the driver or another person being required to position himself or herself on the tank top. An inflatable seal is employed to maintain a fluid-tight connection between the closure and the tank top when the closure is closed.

The use of inflatable seals in connection with doors or other closures is known per se and reference may be had to the following United States patents for representative constructions:

U.S. Pat. No. 3,694,962, issued Oct. 3, 1972, U.S. Pat. No. 3,339,785, issued Sep. 5, 1967, U.S. Pat. No. 3,352,446, issued Nov. 14, 1967, U.S. Pat. No. 3,946,772, issued Mar. 30, 1976, U.S. Pat. No. 3,747,275, issued Jul. 24, 1973, U.S. Pat. No. 4,150,509, issued Apr. 24, 1979, U.S. Pat. No. 4,228,135, issued Oct. 14, 1980, U.S. Pat. No. 3,623,627, issued Nov. 30, 1971, and U.S. Pat. No. 5,295,605, issued Mar. 22, 1994.

None of the known prior art arrangements teach or suggest the pneumatic tank truck closure apparatus disclosed and claimed herein.

DISCLOSURE OF INVENTION

The present invention relates to apparatus which efficiently, effectively and safely provides for the opening and closing of a tank of a pneumatic tank truck.

The pneumatic tank truck includes a tank having a tank interior for holding fluent material under pressurized conditions, the tank having a tank top defining an opening communicating with the tank interior.

A closure guide leading to the opening is attached to the tank on the tank top.

A closure is movably mounted relative to the closure guide and movable along the tank top between a first position wherein the closure is over the opening and a second position wherein the closure does not cover the opening and is laterally displaced therefrom.

Prime mover means is connected to the closure for selectively moving the closure between the first and second positions.

The combination also includes an inflatable seal forming a fluid-tight connection between the closure and the tank top when the closure is in the first position.

The apparatus also incorporates at least one air nozzle operatively associated with the closure and the closure guide for directing compressed air in the vicinity of the closure and closure guide to clear away any dirt or debris which might impair relative movement between the closure and closure guide or adversely affect sealing.

Other features, advantages, and objects of the present invention will become apparent with reference to the following description and accompanying drawings.

BRIEF DESCRIPTION OF DRAWINGS

FIG. 1 is a perspective view of a portion of a pneumatic tank truck constructed in accordance with the teachings of the present invention;

FIG. 4 is an enlarged plan view of the closure and closure guide as well as related structure, the closure being shown in closed condition;

FIG. 5 is a cross-sectional view taken along the line 5—5 of FIG. 4;

FIG. 6 is a view similar to FIG. 4 but showing the closure open;

FIG. 7 is a cross-sectional view taken along the line 7—7 of FIG. 6;

BEST MODE FOR CARRYING OUT THE INVENTION

Figure 1A:
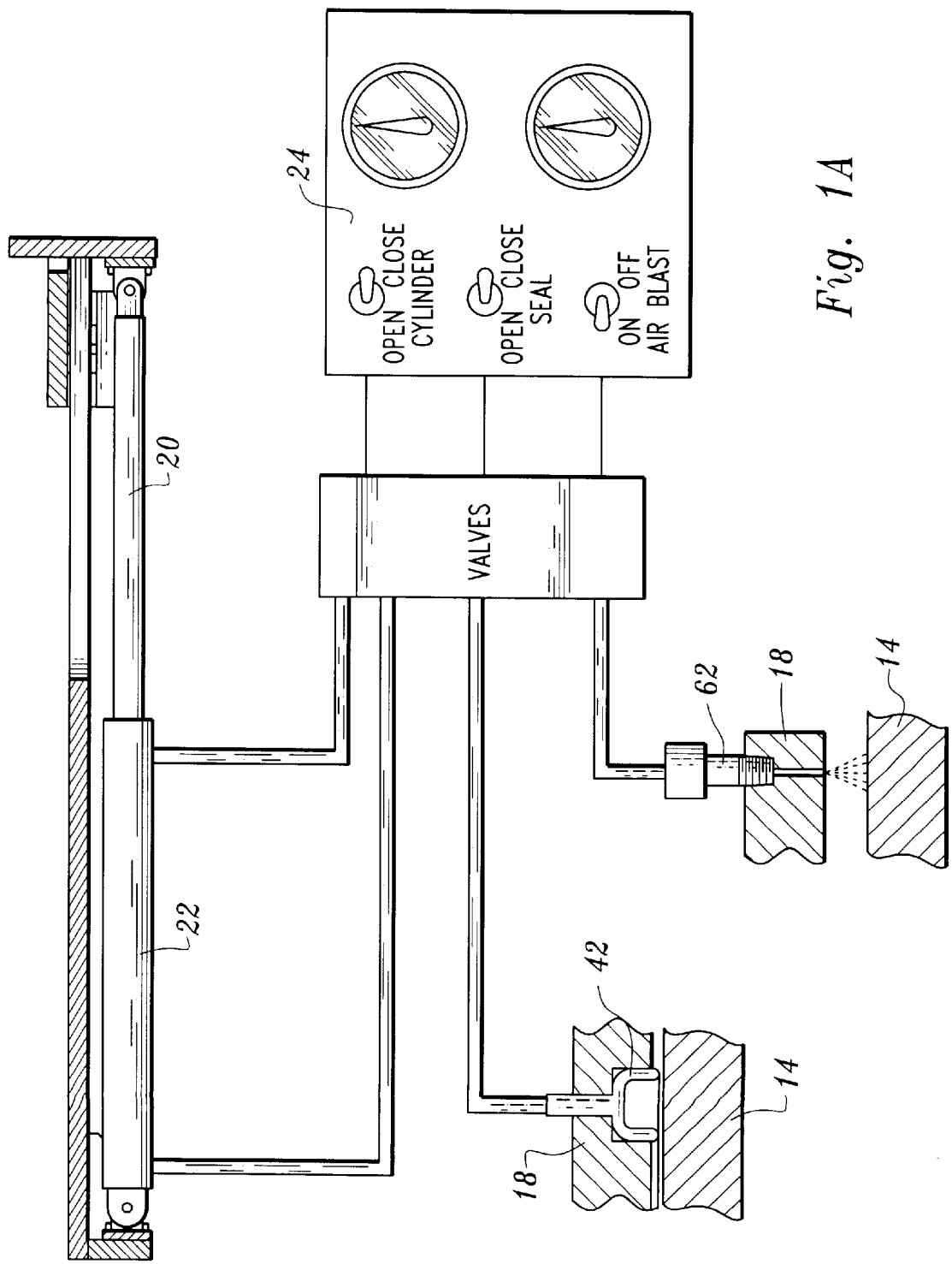
FIG. 1A is a schematic showing features of the control system employed in the invention.
Figure 2:
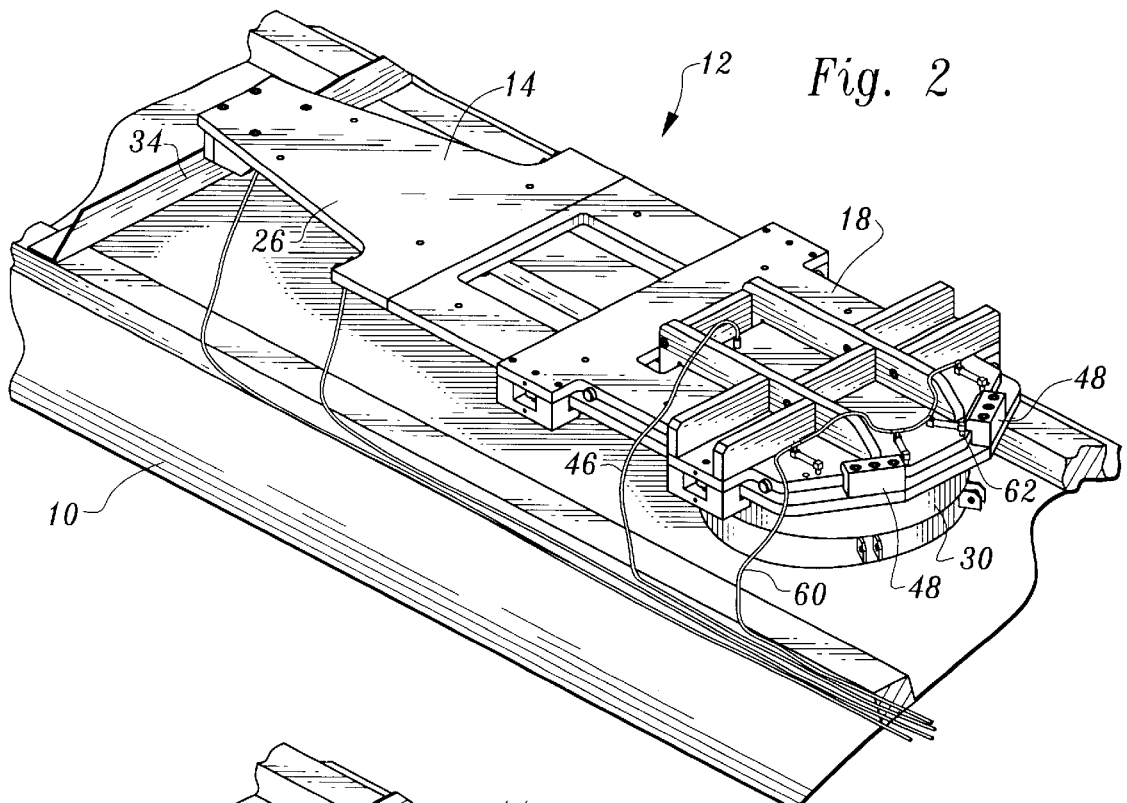
FIG. 2 is a perspective view illustrating a closure and closure guide constructed in accordance with the teachings of the present invention mounted on a truck tank, the closure being shown in closed position.
Figure 3:
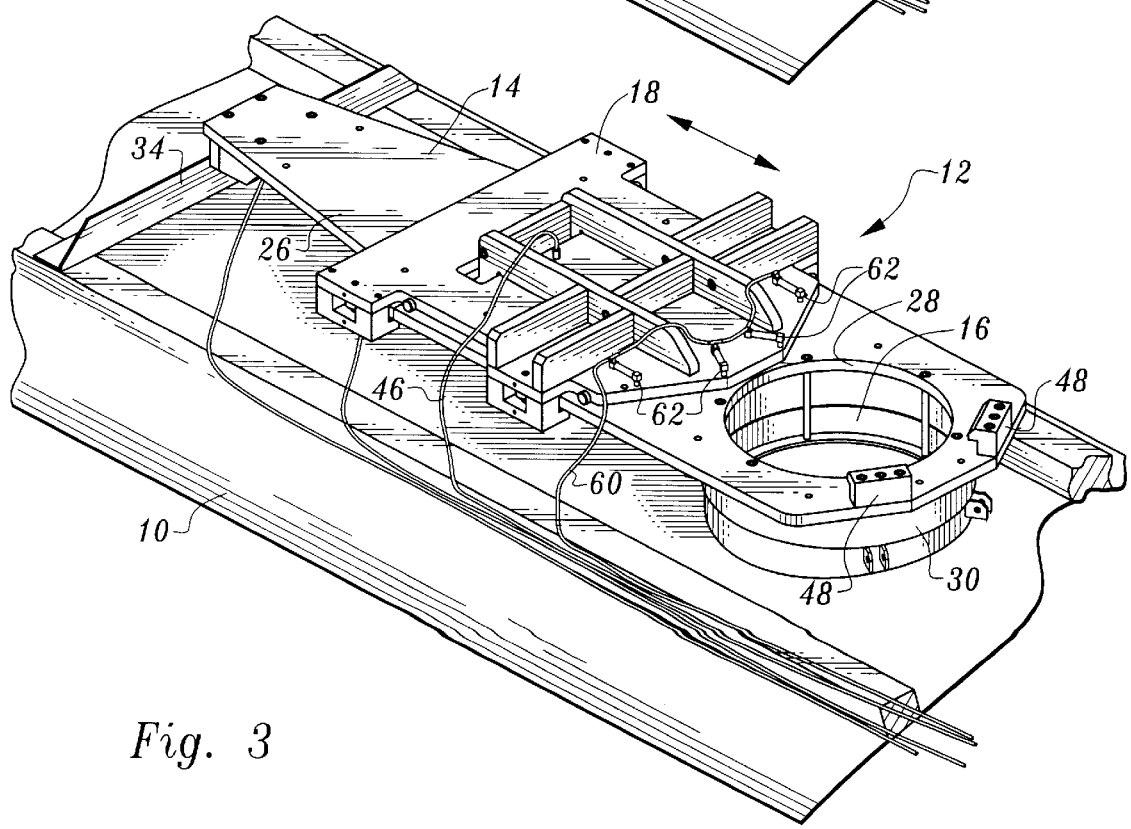
FIG. 3 is a view similar to FIG. 2 but showing the closure in open condition.
Figure 8:
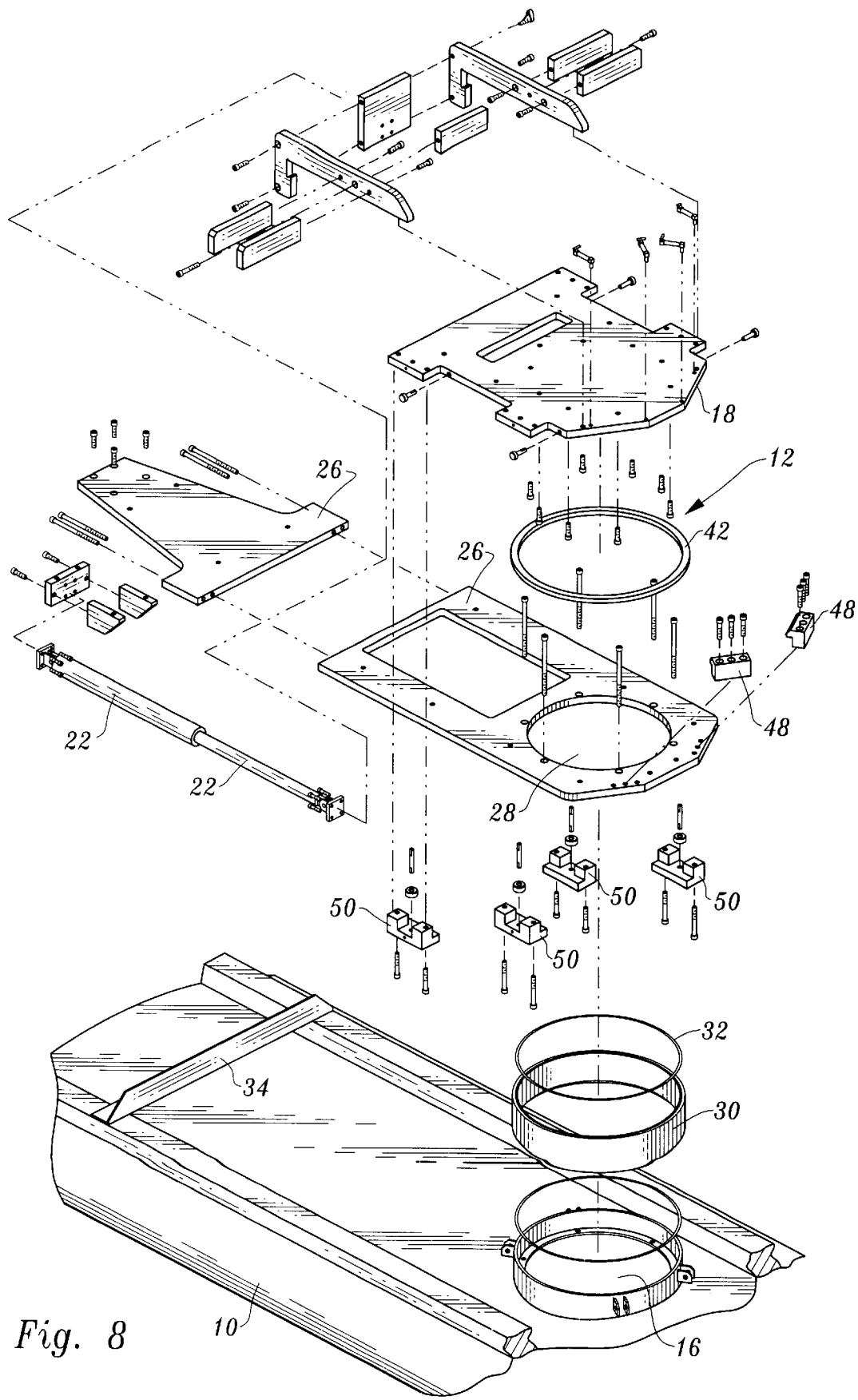
FIG. 8 is an exploded view illustrating components of the invention.

FIG. 1 shows the tank 10 of a pneumatic tank truck. In the embodiment illustrated, the tank 10 has two openings in the tank top thereof leading to the tank interior for holding fluent material under pressurized conditions. Positioned on the tank top and used to open and close the openings are two devices constructed in accordance with the teachings of the present invention identified by reference numeral 12. It will be appreciated that some pneumatic tank trucks may have a single opening and require only one such device. Alternatively, more than two openings and devices may be utilized.

FIGS. 1A–15 show only one such device, it being understood that the devices 12 shown in FIG. 1 are of identical construction.

Device 12 includes a closure guide 14 attached to the tank on the tank top and leading to an opening 16 in the tank.

A closure 18 is movably mounted relative to the closure guide and movable along the tank top between a first position (shown in FIGS. 2, 4 and 5, for example) wherein the closure is over the opening and a second position (shown, for example, in FIGS. 3, 6 and 7) wherein the closure does not cover the opening and is laterally displaced therefrom.

Such movement is effected by a prime mover in the form of a pneumatically operated piston 20 projecting from a pneumatic cylinder 22. Piston 20 is attached to the closure 18 and the cylinder is attached to closure guide 14. Operation of the piston/cylinder combination is carried out by actuating control valve switches on a control box 24 mounted on the truck at a location where the driver has ready access. FIG. 1 shows two such control boxes, each one being used to control a single device 12. FIG. 1A illustrates a control box operatively associated with valving associated with the pneumatic cylinder and piston as well as with other structural components of the apparatus.

The closure guide includes a flat guide plate 26 (shown of multi-part construction in the disclosed embodiment) which extends along a portion of the length of the tank body. One end of the flat guide plate 26 has a hole 28 formed therein, the hole being in communication with the opening 16. The opposed end of the plate is affixed in place relative to the tank body at a location spaced from the tank inlet member.

More specifically, the end of the flat guide plate having hole 28 is secured by mechanical fasteners extending between the guide plate and tank to the top of a tank inlet member 30 forming opening 16. An O-ring 32 is positioned between the tank inlet member 30 and the flat guide plate.

The flat guide plate is disposed above, extends along and is parallel to the tank top in the vicinity of the opening 16. The end of the flat guide plate not having the hole 28 formed therein is affixed to a brace 34 attached to the tank body.

A plurality of rollers 40 are rotatably mounted on the closure and engage the closure guide. The rollers not only serve to facilitate movement of the closure relative to the closure guide, they stabilize the closure during such movement.

Connected to the bottom of the closure is a circular-shaped, inflatable seal 42 accommodated by a circular groove 44 formed in the closure. The interior of the inflatable seal 42 is connected via flexible conduit 46 to a source of pressurized air. The seal 42 is inflated only when a seal is to be formed between the tank and the closure. Suitable switching at a control box 24 enables the operator to readily operate associated control valves to control inflation and deflation of the seal 42 (see FIG. 1A).

Figure 9:
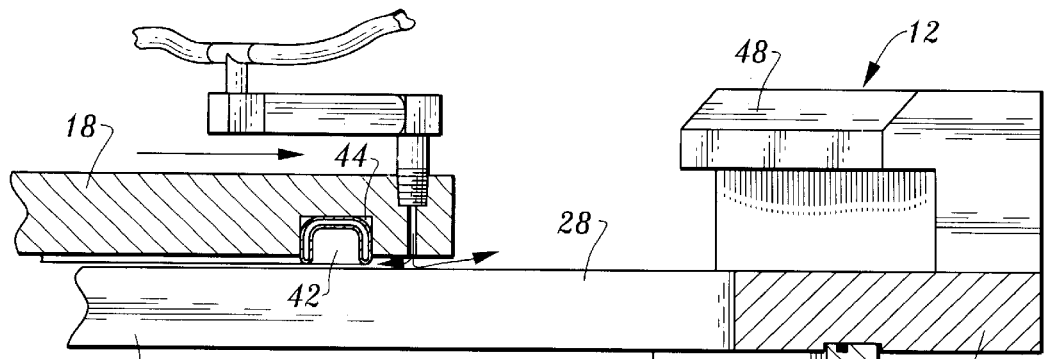
FIG. 9 is a partial cross-sectional view illustrating a portion of the apparatus closure guide and closure, along with a pneumatic, inflatable seal and a compressed air jet nozzle associated with the closure.
Figure 10:
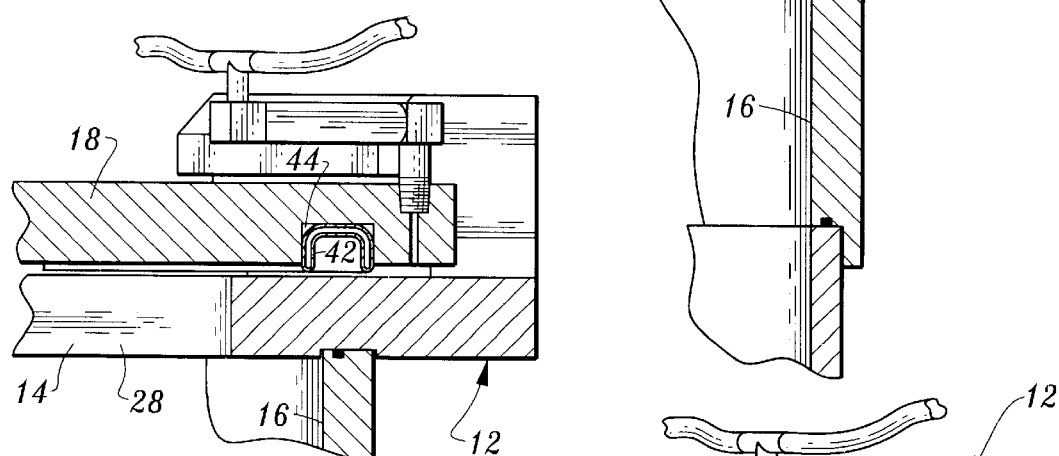
FIG. 10 is a greatly enlarged, cross-sectional view taken along the line 10—10 of FIG. 4, illustrating the closure in closed condition.
Figure 11:
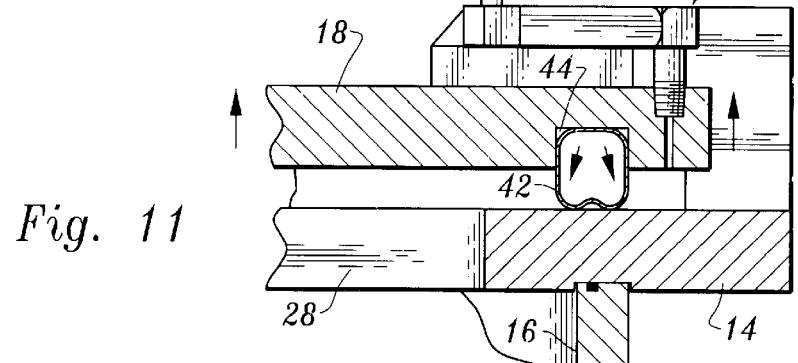
FIG. 11 is a view similar to FIG. 10 but illustrating the inflatable seal of the apparatus in inflated condition and raising the closure relative to the closure guide.
Figure 12:
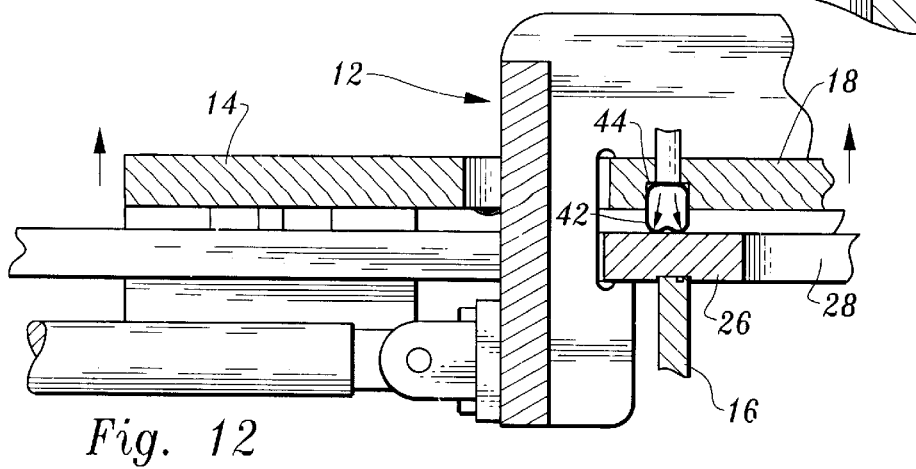
FIG. 12 is a greatly enlarged, cross-sectional view taken along the line 12—12 of FIG. 4, again showing the inflatable seal inflated and raising the closure.
Figure 13:
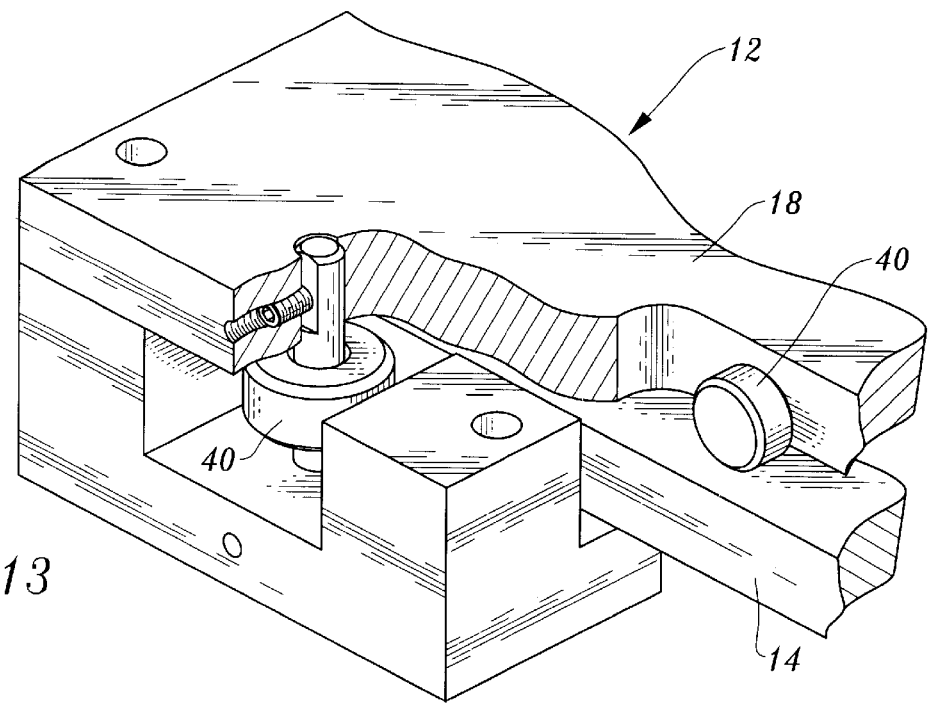
FIG. 13 is a greatly enlarged, perspective view in partial cross-section of a portion of the closure and closure guide, along with rollers operatively associated therewith.
Figure 14:
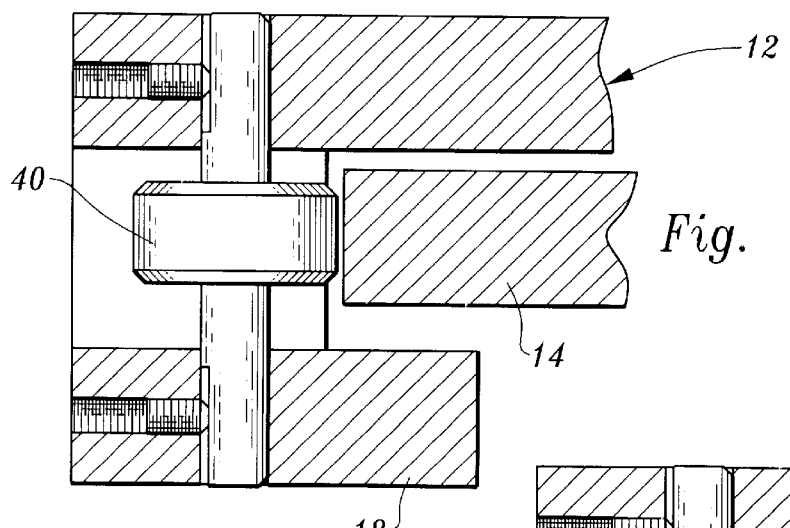
FIG. 14 is a partial, sectional view taken along the line 14—14 of FIG. 4, the closure being in the position relative to the closure guide assumed thereby when the seal is inflated.
Figure 15:
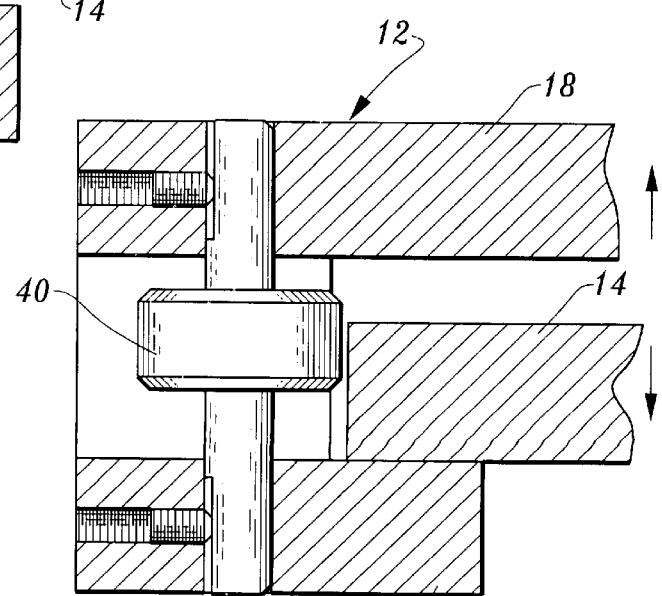
FIG. 15 is a view similar to FIG. 14 but illustrating the position assumed by the closure relative to the closure guide when the inflatable seal is deflated.

FIGS. 9 and 10 show the seal 42 deflated or collapsed. FIGS. 11 and 12, on the other hand, show the seal 42 inflated. In the preferred arrangement illustrated, the closure 18 is capable of some degree of vertical movement relative to the closure guide. Inflation of the inflatable seal 42 will cause the closure 18 to rise as shown in FIGS. 11 and 12. Upward movement of the closure 18 is limited by restraint members 48 and 50. Restraint members 48 are affixed to the closure guide 14 and the restraint members 50 are affixed to the closure.

The restraint members have a hook-like configuration and they are spaced from one another. Upward movement of the closure will cause the restraint members 50 on the closure to engage the closure guide and the restraint members 48 affixed to the closure guide to be engaged by the upper surface of the closure. The vertical distance the closure may travel is of course less than the expansion limits of the seal 42, so that the closure will be highly stable while a fluid-tight seal exists.

A flexible conduit 60 from a source of compressed air leads to a plurality of air nozzles 62. When the air nozzles are connected to a source of compressed air they direct the compressed air in the vicinity of the closure and closure guide to clear away any dirt or debris which might impair relative movement between the closure and closure guide. Furthermore, the downwardly directed jets emitted from the air nozzles clear the area around opening 16 and in the vicinity of inflatable seal 42 to ensure that no foreign material exists in that area which will compromise the seal formed upon inflation of seal 42. Air flow to the air jets can be controlled from a switch on control box 24, as shown in FIG. 1A; alternatively, the jets may be energized automatically when the closure moves.

The structure of device 12 is readily adapted for installation on a pneumatic tank truck during manufacture thereof but also can readily be installed as a retrofit to replace existing manually operated closures commonly employed on such vehicles.

The invention claimed is:

1. In combination:

a pneumatic tank truck including a tank having a tank interior for holding fluent material under pressurized conditions, said tank having a tank top defining an opening communicating with said tank interior;

a closure guide leading to said opening attached to said tank on said tank top and extending along at least a portion of said tank top;

a closure movably mounted relative to said closure guide and movable along said tank top and said closure guide between a first position wherein said closure is over said opening and a second position wherein said closure does not cover said opening and is laterally displaced therefrom, said closure being movable in both a horizontal direction and a vertical direction relative to said tank top and said opening;

a plurality of rollers operatively associated with said closure for facilitating movement of said closure along said closure guide;

prime mover means connected to said closure for selectively moving said closure between said first and second positions;

a seal forming a fluid-tight connection between said closure and said tank top when said closure is in said first position, said seal comprising an inflatable seal disposed between said tank top and said closure when said closure is in said first position, said inflatable seal being selectively alternatively inflated and deflated, said inflatable seal when being inflated and deflated operable to move said closure vertically relative to said tank top and said opening; and a plurality of restraint members for limiting vertical movement of said closure when said inflatable seal is being inflated.

2. The combination according to claim 1 wherein at least some of said restraint members are stationary relative to said tank top and engageable by said closure when said closure is in said first position and said inflatable seal is inflated.

3. The combination according to claim 2 wherein at least some of said restraint members are affixed to said closure and engageable with said closure guide when said closure is in said first position and said inflatable seal is inflated.

4. The combination according to claim 1 wherein said restraint members comprise a plurality of spaced, hook-like members affixed to either said closure or said closure guide.

5. The combination according to claim 1 wherein said tank includes a tank body and a tank inlet member extending upwardly from said tank body and defining said opening at a location spaced from said tank body, said closure guide being disposed above said tank body and supporting said closure above and spaced from said tank body.

6. The combination according to claim 1 wherein said prime mover means includes at least one pneumatically operated piston projecting from a pneumatic cylinder and attached to said closure.

7. The combination according to claim 1 additionally comprising at least one air nozzle operatively associated with said closure and said closure guide for directing compressed air in the vicinity of said closure and closure guide to clear away dirt or debris which might impair relative movement between said closure and closure guide.

8. The combination according to claim 7 wherein a plurality of air nozzles are mounted on said closure for directing a plurality of compressed air jets toward said closure guide.

9. The combination according to claim 5 wherein said closure guide includes a flat guide plate elevated with respect to said tank body and extending along a portion of the length of said tank body, said flat guide plate having two spaced guide ends, one guide plate end being secured to said tank inlet member and defining a guide plate hole in communication with said opening, and the other of said plate ends being affixed in place relative to said tank body at a location spaced from said tank inlet member.

10. The combination according to claim 9 additionally comprising an O-ring seal between said guide plate and said tank inlet member.

11. The combination according to claim 10 additionally comprising mechanical fastener means securing said guide plate to said tank inlet member.

12. The combination according to claim 8 additionally comprising flexible conduit attached to said plurality of nozzles for connecting said plurality of nozzles to a source of compressed air.

13. The combination according to claim 9 wherein said closure guide includes a brace affixed to the other of said guide plate ends and attached to said tank body.

14. The combination according to claim 1 additionally comprising control means mounted on said pneumatic tank truck at a location spaced from said tank top for controlling said prime mover means.

15. The combination according to claim 1 additionally comprising control means mounted on said pneumatic tank truck at a location spaced from said tank top for controlling flow of compressed air to said inflatable seal.

16. The combination according to claim 7 additionally comprising control means mounted on said pneumatic tank truck at a location spaced from said tank top for controlling flow of compressed air to said at least one air nozzle.

* * * * *